Nov. 17, 1964     T. E. OWEN     3,156,963
ONE-DIRECTIONAL CLUTCH

Filed Jan. 19, 1962     2 Sheets-Sheet 1

Tom E. Owen
INVENTOR.

BY Browning, Simms,
Hyer & Eisenraht
ATTORNEYS

Nov. 17, 1964     T. E. OWEN     3,156,963
ONE-DIRECTIONAL CLUTCH
Filed Jan. 19, 1962     2 Sheets-Sheet 2
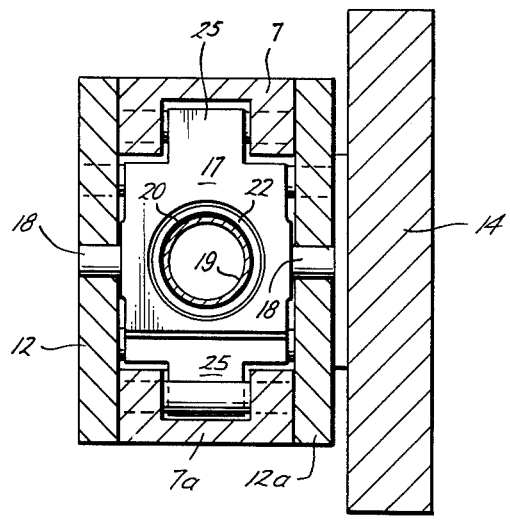
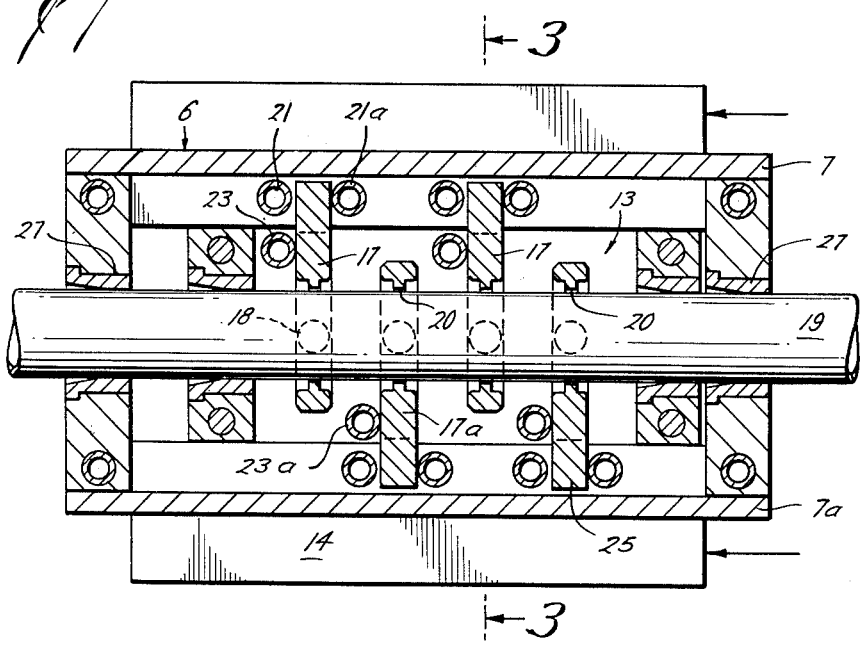
Tom E. Owen
INVENTOR.
BY Browning, Simms,
Hyer & Eisenrohl
ATTORNEYS

United States Patent Office 3,156,963
Patented Nov. 17, 1964

3,156,963
ONE-DIRECTIONAL CLUTCH
Tom E. Owen, Houston, Tex., assignor to Hudson Engineering Corporation, Houston, Tex.
Filed Jan. 19, 1962, Ser. No. 167,353
3 Claims. (Cl. 24—249)

This invention is an improved one-directional clutch. It has special utility in processes for inserting tightly fitting pipes of a strong, rigid material, such as steel, into pipes of softer metal, such as aluminum; but it is not limited to this use.

It is often desirable to insert a hard, rigid pipe, such as a steel pipe, into an aluminum pipe tightly fitting thereon. This step is frequently used in making compound pipes for heat exchanger use wherein a steel pipe is used to supply the necessary strength and rigidity, and a tightly fitting aluminum skin is first worked upon the steel pipe and then rolled to produce laterally extending fins giving greatly increased heat exchange surface. In the past, this process has been a very difficult one to carry out, and almost every known type of one-directional clutch has been tried in combination with a reciprocating drive for intermittently advancing the steel tube into an aluminum coat without success. When reciprocating one-way clutches have been applied to this use, they have all resulted in tearing and distorting the softer aluminum coat so frequently and extensively that their use has been abandoned, and at present this insertion process is performed by hand.

It is an object of this invention to provide a one-directional clutch which is usable for inserting tubing of hard, rigid material, such as steel, into a tightly fitting tube of a softer and easily deformable material, such as aluminum.

Another object is to provide a one-directional clutch in which gripping forces exerted upon an elongate object gripped by the clutch are so evenly distributed about the object that thrust transmitted from the clutch to the elongate object is in a direction parallel to the axis of the elongate object.

Another object is to provide a one-way clutch of tilting-plate type which may be reciprocated upon an elongate object, such as a pipe, to intermittently advance the elongate object in a straight line with substantially no lateral vibration or deviation of the object from straight line travel.

Another object is to provide an improved one-directional clutch of tilting-plate type in which snugly fitting guides and evenly distributed gripping forces cooperate to advance an elongate object intermittently gripped by the clutch in a rectilinear direction.

Other objects, advantages and features of this invention will be apparent to one skilled in the art upon a consideration of the written specification, the attached claims and the annexed drawings.

The present invention is based upon the discovery that tearing and distortion of tubes of softer material by hard, rigid tubes inserted into the softer tubing by prior one-directional clutches have been due to the fact that prior one-directional clutches do not grip a tube to which they are applied in a manner to exert thrust upon the tube in a direction parallel with the axis of the tube. Clutches having tilting plates or releasable dogs which release the object gripped on application of a longitudinal force in one direction, and grip the object in response to longitudinal force in the opposite direction, have not gripped the object in such manner that the longitudinal force applied to the clutch is transmitted to the object gripped in a direction parallel to the longitudinal axis of the object. Also, it has been found that only slight deviation of the resultant force from a direction parallel to the axis is sufficient to cause a steel pipe to bite into a tightly fitting aluminum tube into which it is being inserted so that tearing or severe distortion of the aluminum pipe results.

Based on this discovery, the present invention provides a one-directional clutch in which gripping forces are applied to opposite sides of the object gripped so that application of a longitudinal force through the clutch to the object gives a resultant longitudinal force parallel to the axis of the object gripped.

The present invention contemplates an improved one-directional clutch of tilting-plate type in which all plates are movable in one direction to tilt alternate plates into oppositely sloped positions. A plurality of plates having aligned openings therethrough of size and shape to receive an elongate object loosely when the plates are substantially normal to the elongate object and grip the object on tilting of the plates are provided. These plates are arranged in side-by-side relationship but are spaced from each other at a distance sufficient to permit alternate plates to tilt into oppositely sloped positions. That is, in the tilted position, the slope of one plate will be positive with relation to a line normal to the longitudinal axis of the object gripped and the slope of the next plate in the series will be negative. In order to tilt the plates into sloped position and restore them to a position normal to the longitudinal object, thus releasing their grip upon it, a lost-motion assembly is provided which includes a plate-carrying member and a plate-tilting member arranged for limited reciprocating movement relative to each other.

In preferred form, either the plate-tilting member or the plate-carrying member is slidable for a limited distance within an opening in the other. The plates are carried by the plate-carrying member so that they are tiltable in one longitudinal direction into oppositely sloped positions, and the plate-tilting member is arranged to move in one direction to contact one side of each of the plates and to tilt them into alternately oppositely sloped positions and on relative motion of the plate-tilting member to contact opposite sides of each of the plates and to move the plates into untilted position substantially normal to the object gripped.

It will be seen that a great many arrangements of plates, plate-carrying member and plate-tilting member may achieve this result. For example, if the plate-carrying member is slidable within an opening in the plate-tilting member, all plates may be pivotally attached to the plate-carrying member while the plate-tilting member is arranged to contact opposite edges, such as top and bottom edges, of alternate plates on relative reciprocating motion in one direction with respect to the plate-carrying member, thus tilting alternate plates into oppositely sloped positions.

On the other hand, if it be desired to have the plate-tilting member slidable within the plate-carrying member, alternate plates may be pivotally attached or otherwise tiltably carried at points adjacent to their opposite edges and the plate-tilting member is arranged to contact an edge of each plate at points substantially central thereof.

It is preferred that means be provided for reciprocating the entire clutch assembly when it is to be used for intermittently advancing an object such as a pipe, but it may be used in stationary positions when it is desired to hold an elongate object against an intermittent thrust. A cooperating pair of these one-directional clutches also may be used in which one clutch preferably is reciprocating and the other is stationary when it is desired to eliminate all longitudinal forces between the two which are not parallel to the axis of the object operated upon.

One preferred type of one-directional clutch found particularly useful in inserting steel pipe into aluminum pipe is illustrated in the attached drawings wherein like reference numerals are used throughout to designate like parts and wherein:

FIG. 3 is a cross section through the clutch on the line 3—3 of FIG. 4; and

FIG. 4 is a vertical cross section of the clutch of FIG. 2 with the plates shown in position normal to the longitudinal axis of the pipe, and thus in pipe-releasing position.

Figures 1, 2:
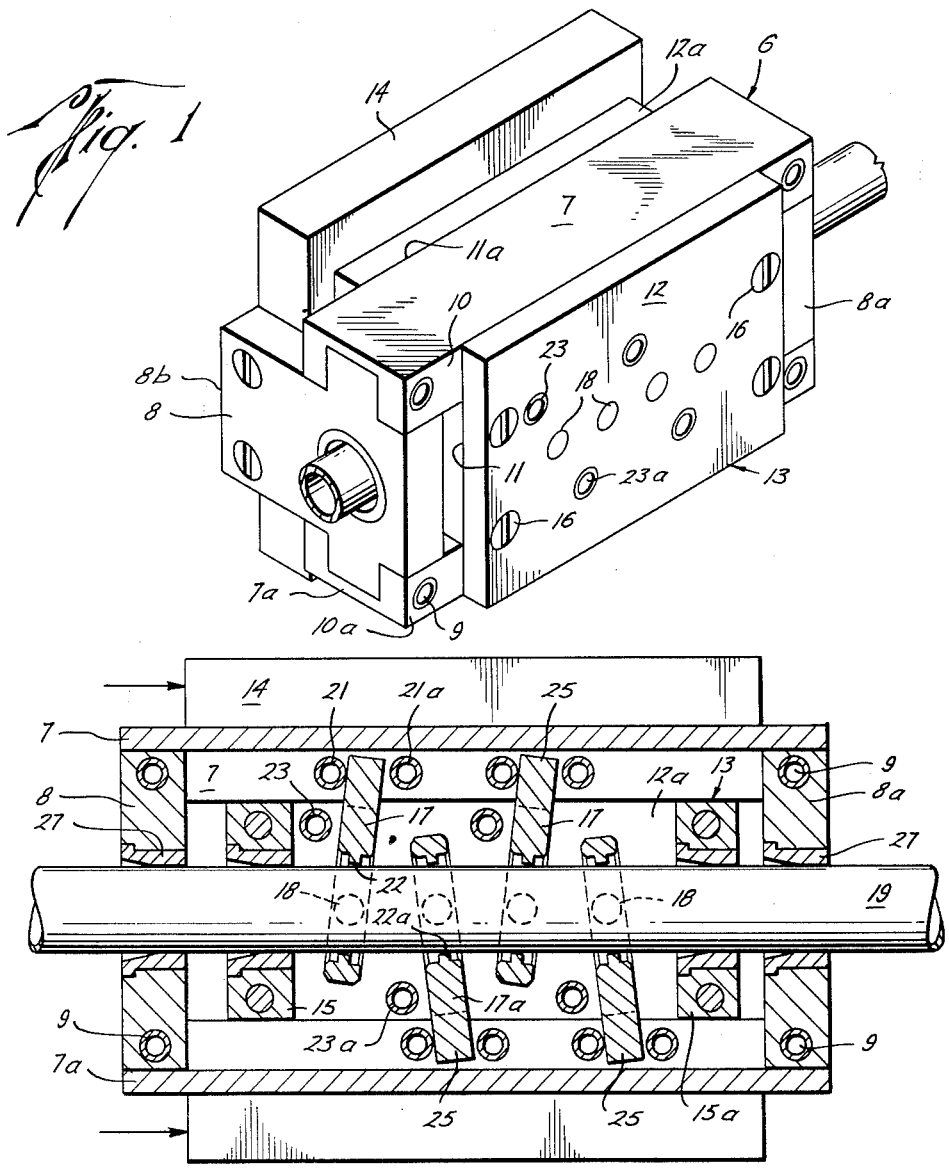
FIG. 1 is a perspective view of a preferred one-directional clutch showing a pipe extending therethrough.
FIG. 2 is a vertical section through the clutch of FIG. 1 showing the plates tilted into pipe-gripping position.

In the drawings, the reference numeral 6 designates a plate-tilting member generally. In the preferred type illustrated, the plate-tilting member is composite and is made up of top and bottom pieces 7 and 7a, respectively, which are U-shaped in cross section. End pieces, 8 and 8a, are attached to the top and bottom members 7 and 7a by a suitable rigid attachment illustrated as countersunk bolts 9. The side surfaces 10 and 10a of top and bottom members 7 and 7a preferably are plane throughout their length and serve as guides for limited reciprocating movement of side pieces 12 and 12a of the plate-carrying member 13 slidably disposed within plate-tilting member 6 for limited reciprocating motion therein.

The end pieces 8 and 8a illustrated have projecting portions 8b adapted to receive a means for reciprocating the entire assembly between them. This means for reciprocating the assembly is illustrated as a block 14 adapted to be attached to a pitman or any other source of reciprocating motion.

The plate-carrying member 13 is best shown in FIGS. 2, 3 and 4. It comprises a pair of side pieces 12 and 12a and a pair of end members 15 and 15a, slidable upon the inner surfaces of top and bottom members 7 and 7a. Side pieces 12 and 12a are rigidly attached to end pieces 15 and 15a, preferably by machine screws 16.

The plate-tilting member 6 and the plate-carrying member 13 thus form a pair of interlocking, substantially rectangular members arranged for limited reciprocating motion relative to each other. Variations from straight line motion during relative reciprocation preferably are substantially eliminated by the smooth sliding fit of end pieces 15 and 15a upon the inner surfaces of top and bottom members 7 and 7a, and any lateral motion is prevented by the smooth fit of side pieces 12 and 12a upon the laterally external surfaces 10 of top and bottom members 7 and 7a.

A plurality of plates 17 and 17a are tiltably carried by the plate-carrying member 13, preferably upon a series of pivots 18, rotatable in side pieces 12 and 12a. Plates 17 and 17a are illustrated as identical in size and shape, but alternate plates occupy reversed positions with respect to a pipe 19 which is insertable through a series of aligned openings 20 in the plates. These openings are of such size and shape to receive an elongate object such as pipe 19 loosely when the plates are in a position normal to the longitudinal axis of the object as shown in FIG. 4 and to grip the pipe when tilted as illustrated in FIG. 2. It will be observed that plates 17 and 17a each have an elongate portion 25 at one side of the corresponding opening 20 which in alternate plates is disposed upon opposite sides of the series of openings 20.

Top and bottom pieces 7 and 7a of the pipe-tilting member 6 are equipped with a pair of stops 21 and 21a for each plate. Stops 21 and 21a preferably are spaced from each other by a distance slightly greater than the thickness of plates 17 and 17a to permit free movement of the plate between the stops. Stops 21 and 21a preferably are countersunk bolts disposed through lateral surfaces 10 of top and bottom pieces 7 and 7a, respectively.

It will thus be seen that relative movement of plate-tilting member 6 and the direction of the arrow shown in FIG. 2 relative to the plate-carrying member 13 results in contact of a stop 21 with a face of each plate, thus moving each plate in one longitudinal direction into oppositely sloped positions.

The leading faces of shoulders 22 and 22a on alternate plates surrounding openings 20 therethrough are thus brought into pipe-gripping position upon the exterior of pipe 19. The principal gripping force is thus exerted on opposite sides of pipe 19, and the minor gripping forces exerted by the trailing edges of shoulders 22 and 22a also are exerted upon opposite sides of the pipe. This distribution of gripping forces thus gives a resultant force parallel to the longitudinal axis of pipe 19 when the reciprocable member 14 is moved in the direction of the arrow in FIG. 2 to apply a longitudinal force to the pipe through the uni-directional clutch arrangement.

A series of stops 23 and 23a are carried by the plate-carrying member and are cooperable with stops 21a carried by the plate-tilting member to move each of the plates into position normal to the longitudinal axis of the object gripped on application of force in the direction of the arrow in FIG. 4. Application of force to member 14 thus first moves the plate-tilting member 6 relative to plate-carrying member 13 so that stops 21a bear upon a side of the plate and restore the plates to normal position. Stops 23 and 23a prevent plates 17 and 17a from being carried past the normal position and arrest their pivoted movement, with openings 20 around the pipe in position to fit loosely thereon so that the entire assembly may be moved backward without gripping the pipe. Movement in the direction of the arrow of FIG. 2 then immediately moves the plates into pipe-gripping position and further movement of the entire assembly carried by reciprocating member 14 results in intermittent advance of the object gripped by the plates.

Cooperation with portion 25 of each plate with corresponding stops 21, 21a, 23 and 23a and pivots 18 results in all plates being moved in one direction into alternately sloped positions, thus providing for the even distribution of gripping forces around the plate so that the resultant of any force applied in the direction of the arrows in FIGS. 2 and 4 is always in a direction parallel to a longitudinal axis of the object gripped.

Preferably a series of guides 27 of such size as to fit closely upon the exterior surface of the object to be gripped by plates 17 and 17a and aligned with openings 20 in the plates are disposed through end pieces 8, 8a, 15 and 15a. These guides preferably are tapered outward on the side from which the object to be gripped is introduced to permit easy introduction, but fit snugly all around the object. The close arrangement of guides and plates illustrated provides means for eliminating substantially all deviation of the object from rectilinear travel when intermittently advanced by reciprocation of the clutch assembly.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A one-directional clutch comprising in combination a series of plates spaced from each other in side by side relationship and having aligned openings therethrough of size and shape to receive an elongate object loosely when the plates are substantially perpendicular to the elongate object and to grip the object when the plates are tilted; and means for moving alternate plates in said series to and from oppositely sloped tilted gripping positions comprising a lost motion assembly enclosing said plates and having openings therethrough aligned with the openings in the plate including a plate carrying member carrying alternate plates tiltably into oppositely sloped positions and a plate tilting member having stops thereon, one of said plate carrying member and plate tilting member being slidable within the other for a limited distance and said stops on the plate tilting member being arranged in a number of pairs equal to the number of plates with the stops of each pair disposed on opposite sides of a corresponding plate in position to contact and move the plate on relative sliding movement between the plate carrying member and the plate tilting member.

2. The clutch of claim 1 wherein the openings in the lost motion assembly aligned with openings in the plates are openings through guide members in ends of both the plate carrying member and plate tilting member and are of such size and shape that the guide members fit closely upon an elongate object gripped by said plates and said guides are cooperable with said plates to maintain rectilinear direction of thrust applied to said object by said plates.

3. The clutch of claim 2 wherein the plate-carrying member is slidable within the plate-tilting member.

References Cited in the file of this patent

UNITED STATES PATENTS

| | | |
|---|---|---|
| 2,157,639 | Staggers | May 9, 1939 |
| 2,170,323 | Gorshkoff | Aug. 22, 1939 |
| 2,242,431 | Lucker | May 20, 1941 |
| 2,341,465 | Monnot | Feb. 8, 1944 |
| 2,670,174 | Lucker | Feb. 23, 1954 |
| 2,718,253 | Zinke | Sept. 20, 1955 |
| 2,871,713 | House | Feb. 3, 1959 |
| 2,974,931 | Reel et al. | Mar. 14, 1961 |

FOREIGN PATENTS

| | | |
|---|---|---|
| 203,786 | Great Britain | Sept. 14, 1923 |